Aug. 9, 1966    J. E. CRONIN    3,265,445
CONVEYOR CONDUIT
Filed Jan. 20, 1964

INVENTOR
JOHN E. CRONIN

BY   *Fred C. Carlson*
ATTORNEY

3,265,445
CONVEYOR CONDUIT
John E. Cronin, Newark, Del., assignor to E. I. du Pont de Nemours and Company, Wilmington, Del., a corporation of Delaware
Filed Jan. 20, 1964, Ser. No. 338,703
1 Claim. (Cl. 302—64)

This invention relates to improvements in processes and apparatus for conveying in conduits, as gaseous suspensions, particulate solids which have a tendency to deposit and cake upon the internal surfaces of said conduits. It is more particularly directed to such processes comprising the steps of (1) employing as the conduit an inflatable elastic tube having external means to restrict to a predetermined limit the diametric expansion capability thereof, (2) passing the gaseous suspension of particulate solid into said conduit tube while the diametric expansion is less than said predetermined limit, and (3) removing depositions of the particulate solid from the internal surface of the tube by inflating said tube while passing a gas therethrough; is further directed to conduits comprising an inner, elastic tube circumferentially enclosed with an outer means for limiting the diametric expansion capability of said tube at a predetermined diameter, said diameter being greater than the outside diameter of the elastic tube when deflated, and means for inflating said elastic tube; and is still further directed to conveyor systems comprising, in combination with means for suspending a particulate solid in a gas and means for separating said solid from said gas, a conduit connecting said suspending and separating means, said conduit comprising an inner, elastic tube, for receiving, conveying and discharging said suspension, said tube being circumferentially enclosed with an outer means for limiting its diametric inflation capability at a predetermined diameter, said diameter being greater than the outside diameter of the elastic tube when deflated, and means for inflating said elastic tube.

Figure 1:
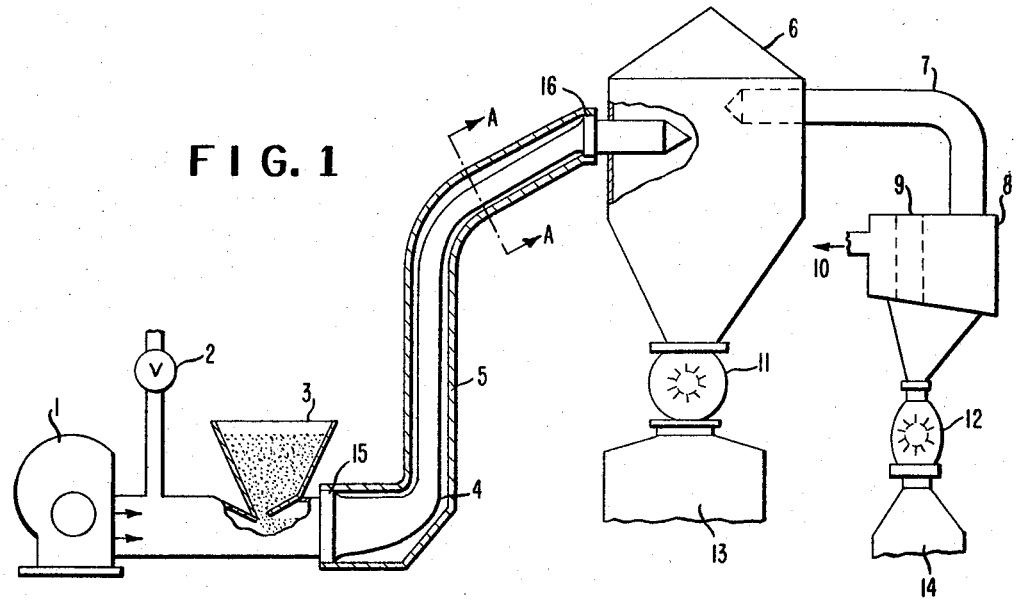
FIGURE 1 shows a side elevation of a conveyor system of the invention, together with ancillary equipment, not to scale.

Pneumatic conveyors have already been used to advantage for conveying free-flowing bulk materials in situations where mechanical conveyors are restricted because of structural difficulties, lack of room, or excessive first cost in view of the quantity of material to be conveyed. In contrast to mechanical devices, pneumatic conveyors sometimes have lower initial costs (especially where moderate quantities of materials are to be conveyed a considerable distance), lower maintenance, and a flexibility of plant whereby such obstacles as roads, rivers, railroads, and buildings can be circumvented with little difficulty. Pneumatic conveyors will carry materials around corners, over obstacles, and essentially wherever conduits can be laid or hung. Other advantages of pneumatic conveyors are automatic features, economy of labor, elimination of spillage, elimination of dust and harmful effects to employees and machinery alike, protection of conveying materials from exposure and loss when in transit, as well as reduction in contamination, reduction in accidents and fire hazards, reduction in the number of moving machine parts needed, and location of these parts where they can be maintained most easily.

Despite these advantages, pneumatic conveyors have hitherto been restricted to certain types and sizes of materials. Although air conveyors have been successful in handling a wide variety of free-flowing materials such as cement, sawdust, wood chips, plastic cubes, feathers, and metal chips, they have until this invention been limited to: (1) materials which pass through a pipe without clogging, and (2) such materials as can be readily separated from conveying gases at the discharge end. This invention now eliminates the first of these restrictiins.

A further difficulty encountered with non-free-flowing particulate solids in pneumatic conveying systems is that the solids tend to "hang up" in the feeding mechanisms and fail to feed uniformly. This results in a feed to the conveyor which is alternately rich and poor in suspended solids. When such a material is being fed to the conveyor system from the hopper of a tank trailer, for instance, it has been found that channeling or "rat-holing" tends to occur, the material feeding properly only with respect to that which is located directly above the outlet. Since the problem of avoiding clogging of the conveying conduits for such materials has never been adequately solved, the combination with suitable feed means has similarly remained unanswered in the prior art.

Now according to the present invention it has been found that the above-mentioned problems of handling non-free-flowing particulate solids in pneumatic conveyor systems can be overcome and that the full advantages of pneumatic conveyance can be achieved with such materials by employing as the conduit an inflatable elastic tube having external means to restrict to a predetermined limit the diametric expansion capability thereof, by passing the gaseous suspension of particulate solid into said conduit tube while the diametric expansion is less than said predetermined limit, and by removing depositions of the particulate solid from the internal surface of the tube by inflating the tube while passing a gas therethrough. The improved processes just described are made possible by the novel conduit in combination with means for inflating the elastic tube, and by conveyor systems using the novel conduit in combination with means for suspending the particulate solid in a gas and a means for separating the solid from the gas.

The art is already familiar with various pneumatic conveyor systems and their applicability to bulk transportation of numerous particulate solid materials. The operation of some of these systems will now be described, to make clear the nature of the improvement effected by the present invention.

Low velocity air conveyors are usually of the fan type and are particularly adapted to handling light, bulky materials such as raw cotton, wool, wood shavings, sawdust, cut rags, waste paper, rubber scrap, jute, granulated cork, asbestos, leather buffings, cast iron chips and borings, crushed steel chips, aluminum chips, and brass chips. Among these materials, those which have a tendency to stick in a conveyor pipe or the fans connected thereto, and materials which are easily damaged, require special care in the application of pneumatic conveying. Also, hydroscopic materials such as salt, raw sugar, and such materials as silk, rayon, unscoured grease wool, and wool heavily laden with oil emulsions, all have a tendency to adhere to the pipe and fan. Fan wheels which have cone backs of smooth construction and which are free from crevices and fins are required to convey these soft materials and similar materials through the fan. For a chosen material there is usually a preferred method and equipment set up for transporting such material by low velocity techniques. These materials can be conveyed equally well by a suction or a pressure system since the conveying effect is due to the gas velocity or the carrying power of air in motion.

A common type of conveyor is a pressure system where the material is fed into a conduit pipe, downstream of the air stream source, and is then carried by the air stream and delivered together with the conveying air to a separator. At this point the material is separated from the air, the conveying air being discharged to the room or atmosphere while the conveyed material is delivered to storage. Such materials as wool and waste paper are sometimes taken through the fan and blown directly into storage bins which have the upper portion covered with coarse screen of ¼ to 1 mesh per inch to allow escape of the conveying air.

In suction-type conveying systems, the fan is placed after the collector which consequently is under suction or vacuum and requires an air lock in the material discharge spout, usually provided by a rotary valve. If intermittent discharge is satisfactory, the seal can be maintained by attaching to the discharge valve an air-tight storage hopper with blast gates at bottom and top. Normal operation is with upper and lower gate closed. Collected material is discharged without breaking the vacuum by closing the upper gate and opening the lower gate. In the conveying of materials containing fine, light dust particles which are to be removed from the conveyed material or which would constitute dust hazard if discharged at the delivery end of a cyclone collector, the use of a secondary filter is required. This secondary collector may be a screen arrestor, electric precipitator, air washer, scrubber, or other comparable device.

The present invention is applicable to both pressure- and suction-type conveyors; however, in the latter type, the pressure within the elastic tube should be no less than the pressure between the elastic tube and the outer retainer.

In either suction or pressure conveying systems, sufficient air has to be introduced with the particulate materials so that the material will be kept in suspension in the air. If this condition is not fulfilled, some of the material will deposit in the pipe and the deposit will accumulate until the system becomes inoperable. For each different particulate solid there is a preferred range of velocity in which either pressure or suction systems are most commonly designed to operate.

For "sticky" materials, such as $TiO_2$, even operation within the preferred velocity range will not insure the continuous suspension essential to successful conveyability. In practice the "sticky" material has a tendency to build up or deposit on the internal surface of the conduit.

With this invention, the problem of dealing with deposition of sticky particulate materials within the conduit has been eliminated, especially in the cases of pigmentary titanium dioxide and finely divided carbon. This is a valuable result, since because of the problem, titanium dioxide and light, fluffy carbon black have hitherto been shipped in bags, entailing higher shipping costs than in bulk.

Now considering the present invention with reference to the foregoing experience of the art, and looking first at the drawings in detail, it will be seen that FIGURE 1 shows a diagrammatic plan of a preferred embodiment of a pipeline conveyor system of the invention. In FIGURE 1 a fan 1 supplies the driving air stream into which the particulate solid material is dropped from feeder 3. The pressure of the air is controlled by by-pass valve 2. The air suspension of particulate solid is propelled into rubber tube 4 connected through an air-tight seal 15, the tube being connected to the collector through air-tight seal 16. The rubber tube 4 is supported by a rigid casing 5 which holds the connecting rubber tube between the feeder and cyclone separator 6 which serves as a collector. Casing 5 is vented to atmosphere by an opening, not shown. Material from the collector passes through a rotary valve 11 into storage bin 13. Overflow dust from the collector passes through conduit 7 into dust receiver 8 and is separated from the effluent gas by filter 9 and passes through rotary valve 12 into dust delivery 14.

The invention deals particularly with the construction of the conduit which is used to transport material from the feeder to the collector. The conduit can be of any suittable material which can be expanded out of shape by an increase of internal pressure. The function of the outer shell or support 5 is to restrict the expandable material in such a manner that it will not form bubbles or blow out from the high pressure.

A preferred embodiment of the invention encompasses the use of a rubber tube which has a restricting outer layer or support. This support can be integral with the tube but of such design as to permit the tube to expand to a predetermined limit and to thereafter restrain further expansion. Such support or covering will, of course, have a larger diameter than the internal diameter of the elastic tube. It can consist, for instance, of a layer of nylon threads wrapped circumferentially around the elastic tube, the threads being kinked as in a sine wave formation so that upon expansion of the elastic tube the thread will straighten out but once straight will restrict further expansion. These nylon threads can be embedded in an outer layer of the elastic tube itself.

Satisfactory materials for use as the elastic tube are elastomers, including natural rubber, or any synthetic type of plastic or rubber which after inflation through internal increases of pressure returns upon deflation or decreases of internal pressure to approximately its original shape or diameter. More particularly the material can be selected from the group consisting of natural rubber, styrene-butadiene copolymer synthetic rubbers, neoprene, butyl rubber, vinyl elastomers, and elastomeric chlorosulfonated polyethylenes. "Hypalon" chlorosulfonated polyethylene is a particularly preferred material because it retains its elastic properties at elevated temperatures.

Figure 2:
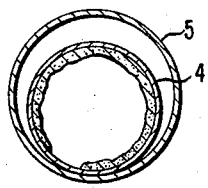
FIGURE 2 shows a cross-section at A—A of the novel conduit showing the internal elastic tube in a deflated condition with caked solids deposited upon its interior wall.
Figure 3:
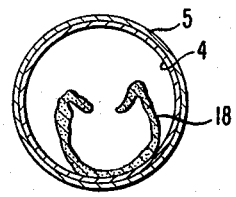
FIGURE 3 shows the same cross-section as FIGURE 2 but with the elastic tube expanded to its outer retainer, the cake of particulate solid being broken away from the interior wall.

The novel conduit works by reason of expanding and contracting the elastic tubing. A decrease in the internal pressure contracts the tube or allows it to return to its original normal shape at atmospheric pressure or at some lower pressure. Referring again to the drawings, FIGURE 2 shows a cross-section of the conduit at section A—A of FIGURE 1 with the elastic tube in the contracted or deflated position relative to retainer pipe 5. A deposit 17 of a non-free-flowing material has built up around the internal wall of the elastic tube. FIGURE 3 is also a cross-section of the conduit at A—A of FIGURE 1, but in FIGURE 3 the elastic tube is in an extended or inflated condition. It will be seen that the elastic tube 4 has expanded to the limit of expansion permitted by retainer tube 5. The deposit of particulate solid 18 has broken away from the internal wall of tube 4 and is in a condition to be picked up and carried away by the gas flowing in the conduit.

The expansion or inflation of the elastic tube can be achieved in a variety of ways. Some of these include (1) varying the speed of the blower, (2) by-passing portions of air through a side-arm air outlet, (3) varying the air intake at various frequencies, (4) varying the leak out rate in the air exhaust stream, (5) closing the outlet valve at various speeds, and (6) developing peristalsis by varying back air purges with the air filter purge. If the external retainer 5 in the drawings is a rigid structure such as a pipe, expansion of the elastic tube can also be achieved by evacuating the space between the inner wall of retainer 5 and the outer wall of elastic tube 4. Broadly, the invention contemplates any means for increasing the diameter of the elastic tube to dislodge the deposited particulate solid material therefrom.

In practice it is sometimes found that the increase in internal pressure caused by the build-up of deposited particles inside the elastic tube is sufficient to cause inflation of the tube, whereupon dislodgement of the deposit therefrom permits the static pressure within the liner to decrease and causes the tube to return to its original diameter.

It will be evident that while the invention has been described as an intermittent operation involved alternately expanding or inflating and contracting or deflating the elastic tube, the intervals of this intermittent operation can be made progressively shorter so that for practical purposes there is a substantially continuous expansion and contraction and no substantial thickness of deposit is allowed to accumulate within the elastic tube.

In the foregoing description, it has been said that the particulate solid is suspended in a gas. The term "pneumatic" has sometimes been used to describe the conveyor system. Ordinarily the gas employed is air, but it will be understood that in special situations other gases, such as nitrogen or carbon dioxide, can be employed and that such gases are contemplated by the term "pneumatic."

The diametric expansion capabilities of the elastic materials employed in the conduit are well known and the predetermined limit imposed thereon by the external means such as the pipe 5 of FIGURE 1 will, of course, be well within the limits of such capability—that is, the expansion will not exceed the elastic limit of the material.

The invention will be better understood by reference to the following illustrative example:

*Example 1*

A rubber tube having an internal diameter of about 2", having a wall thickness of about ⅛" at its deflated dimension and 95 ft. long, was supported by an exterior rigid pipe measuring 4" I.D. This 95 ft. of tube was divided into 4 equal lengths, one horizontal length, one vertical length, one length inclined 30° from the horizontal connected by return bends and another horizontal length prior to the entrance into the cyclone separator or bag filter. A positive discharge blower was provided to supply air into the conduit upstream from an air-lock type rotary feeder. Between the blower and rotary feeder was located a pressure gauge and an air bleed valve. A particulate solid material, pigmentary titanium dioxide, was successfully conveyed through the system as an air suspension for extended periods of time at flow rates in excess of 20,000 pounds per hour. During these tests the bleeder valve was open for two seconds to deflate the rubber tubing and closed for four seconds to inflate the tubing, thereby pulsing the tubing. It was found that the inflation and deflation schedule could be varied at will, and that almost any desired deflation and inflation could be achieved at regular intervals, with satisfactory operation of the equipment. Deflation times of as long as four seconds and as short as one-half second were found to be satisfactory. A motor-driven cam, opening and closing the bleeder valve, was used to regulate and set these various speeds and cycle times for the inflation and deflation of the rubber tubing.

In further tests it was found that successful conveying of $TiO_2$ was achieved without external control of the pressure within the elastic tube. The deposition and build-up of $TiO_2$ on the internal walls of the tube caused a sufficient variation of internal pressure to inflate and deflate the lines.

I claim:

A conduit comprising an inner, elastic tube circumferentially enclosed within outer means for limiting the diametric inflation capability of said tube at a predetermined diameter, said diameter being greater than the outside diameter of the elastic tube when deflated, means for inflating said elastic tube, and a multiplicity of longitudinal members spaced around the circumference of said elastic tube, said members being operative to restrain longitudinal expansion of said tube but being substantially inoperative to restrain diametric inflation thereof.

References Cited by the Examiner

UNITED STATES PATENTS

| | | | |
|---|---|---|---|
| 2,261,347 | 11/1941 | Di Santo | 302—64 |
| 2,391,484 | 12/1945 | Seymour | 302—64 |
| 2,421,977 | 6/1947 | Allen | 193—2 |
| 2,478,326 | 8/1949 | Scarth | 302—33 |
| 2,829,600 | 4/1958 | Sveda | 302—64 |

FOREIGN PATENTS 535,648  4/1941  Great Britain.

EVON C. BLUNK, *Primary Examiner.*

ANDRES H. NIELSEN, SAMUEL F. COLEMAN,
*Examiners.*